United States Patent [19]
Ohki

[11] Patent Number: 5,519,503
[45] Date of Patent: May 21, 1996

[54] PICTURE REPRODUCING APPARATUS

[75] Inventor: Mitsuharu Ohki, Tokyo, Japan

[73] Assignee: Sony Corporation, Tokyo, Japan

[21] Appl. No.: 162,076

[22] PCT Filed: Apr. 13, 1993

[86] PCT No.: PCT/JP93/00471

§ 371 Date: Dec. 9, 1993

§ 102(e) Date: Dec. 9, 1993

[87] PCT Pub. No.: WO93/21731

PCT Pub. Date: Oct. 28, 1993

[30] Foreign Application Priority Data

Apr. 13, 1992 [JP] Japan ..................... 4-093026

[51] Int. Cl.$^6$ ........................................ H04N 7/133
[52] U.S. Cl. ..................... 358/335; 358/906; 348/403; 364/725
[58] Field of Search ..................... 358/335, 342, 358/432, 433, 906; 360/33.1, 32; 348/403; 364/725

[56] References Cited

U.S. PATENT DOCUMENTS

| | | | |
|---|---|---|---|
| 4,754,492 | 6/1988 | Malvar | 348/403 |
| 5,148,271 | 9/1992 | Kato et al. | 348/390 |
| 5,177,618 | 1/1993 | Dunlap et al. | 358/335 |
| 5,187,589 | 2/1993 | Kono et al. | 358/335 |
| 5,258,844 | 11/1993 | Nakayama et al. | 358/906 |
| 5,299,025 | 3/1994 | Shirasawa | 358/432 |

FOREIGN PATENT DOCUMENTS

| | | |
|---|---|---|
| 61-294586 | 12/1986 | Japan . |
| 1238282 | 9/1989 | Japan . |
| 2224489 | 9/1990 | Japan . |
| 4282988 | 10/1992 | Japan . |

Primary Examiner—Thai O. Tran
Assistant Examiner—Huy Nguyen
Attorney, Agent, or Firm—Ronald P. Kananen

[57] ABSTRACT

The picture data on the frequency space, compressed by discrete cosine transform (DCT), is variable length decoded by an inverse variable length encoding (IVLC) circuit 2. The inverse variable length coded picture data is processed by a decoding circuit 3 with an operation which is the reverse of re-quantization. The picture data, processed with the reverse operation of re-quantization, is processed by an near-linear inverse orthogonal transform (IDCT) circuit 4 with inverse orthogonal transform by approximation to a straight line. Respective elements of the picture data, grouped into blocks on the real space, are obtained by the near-linear IDCT circuit 4, and re-arranged in a block resolution circuit for producing replay picture data.

14 Claims, 7 Drawing Sheets

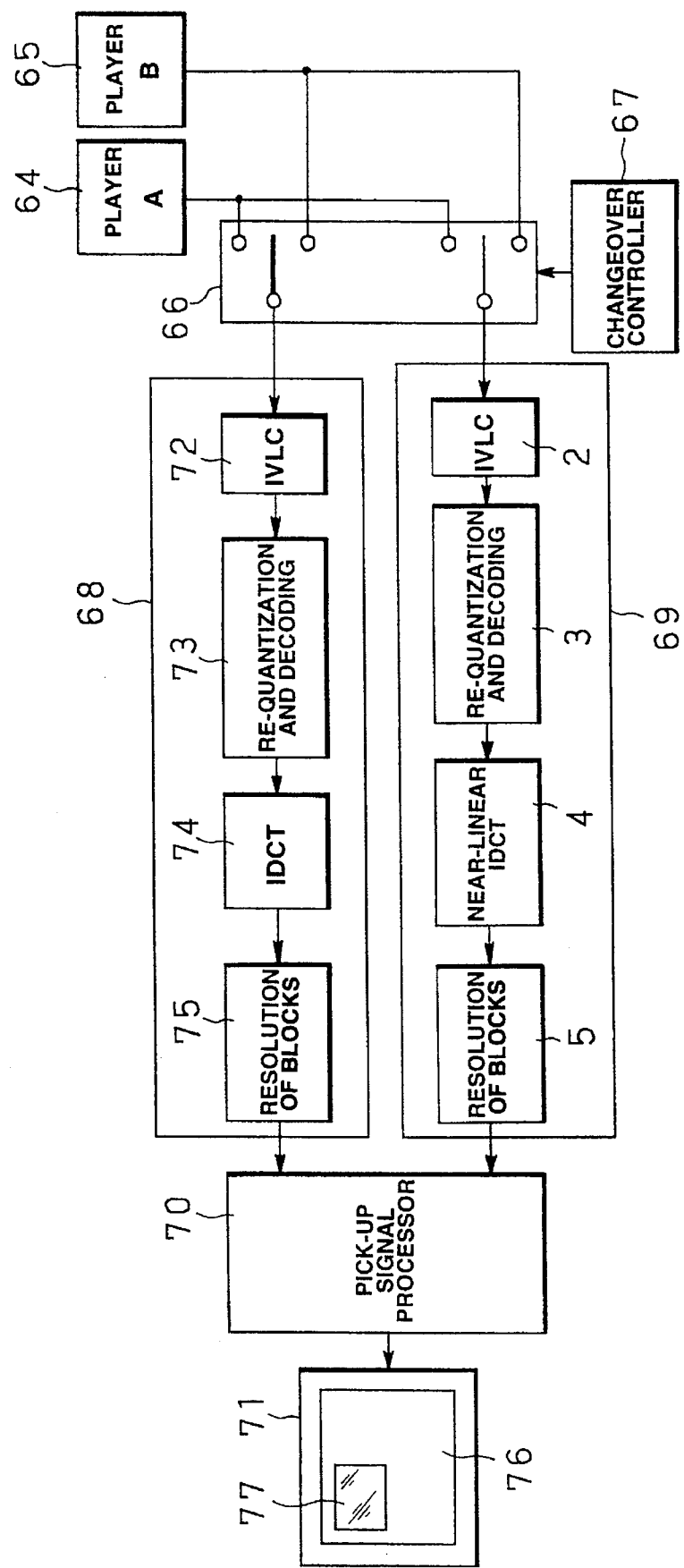

PICTURE REPRODUCING APPARATUS

TECHNICAL FIELD

This invention relates to an improvement in a picture reproducing device in which original picture data is restored from picture data compressed by orthogonal transform.

BACKGROUND ART

In general, picture data located at proximate positions exhibit strong correlation, so that, on orthogonal transform on the frequency domain, high-frequency components become approximately zero. The data volume can be diminished by taking advantage of this feature. That is, picture data are first formed into blocks, each made up of, for example, 8×8 pixels, and a discrete cosine transform (DCT) is performed for each block. The data on the frequency space, produced on DCT, is re-quantized and variable length coded for data compression.

For restoring picture data from the compressed data, the variable length encoded data are first decoded and subsequently the re-quantized data are decoded by way of an inverse operation of re-quantization. The picture data compressed by DCT are processed with inverse discrete cosine transform (IDCT) followed by block resolution.

Heretofore, 8-dimensional DCT is performed as a system of compressing picture data by orthogonal transform.

In an 8-dimensional DCT, picture data $x_i$ for respective pixels (i=0, 1, 2, ... ) are formed into blocks at a period of 8 dots in the horizontal direction (X-direction) and at a period of 8 dots in the vertical direction (Y-direction) for generating matrices X each consisting of 64-dot picture data (elements) $x_{ij}$ in a real space, where $0 \leq i, j \leq 7$. The picture data is transformed for each of the matrices X for producing matrices C each consisting of 64-elements $c_{ij}$ in a space of the spatial frequency, where $0 \leq i, j \leq 7$. The matrix X in the real space and the matrix C in the space of the spatial frequency may be expressed by the following equations 1 and 2:

$$X = \begin{pmatrix} X_{00} & \cdots & X_{07} \\ X_{10} & \cdots & X_{17} \\ \vdots & & \vdots \\ X_{70} & \cdots & X_{77} \end{pmatrix} \quad (1)$$

$$C = \begin{pmatrix} C_{00} & \cdots & C_{07} \\ C_{10} & \cdots & C_{17} \\ \vdots & & \vdots \\ C_{70} & \cdots & C_{77} \end{pmatrix} \quad (2)$$

In such case, DCT may be defined by the following equation (3), using a matrix of DCT transform matrix and a transposed matrix $N^t$ thereof:

$$C = \frac{1}{16} NXN^t, \quad (3)$$

$$N = \begin{pmatrix} \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} \\ \cos\frac{\pi}{16} & \cos\frac{3\pi}{16} & \cos\frac{5\pi}{16} & \cos\frac{7\pi}{16} & \cos\frac{9\pi}{16} & \cos\frac{11\pi}{16} & \cos\frac{13\pi}{16} & \cos\frac{15\pi}{16} \\ \cos\frac{2\pi}{16} & \cos\frac{6\pi}{16} & \cos\frac{10\pi}{16} & \cos\frac{14\pi}{16} & \cos\frac{18\pi}{16} & \cos\frac{22\pi}{16} & \cos\frac{26\pi}{16} & \cos\frac{30\pi}{16} \\ \cos\frac{3\pi}{16} & \cos\frac{9\pi}{16} & \cos\frac{15\pi}{16} & \cos\frac{21\pi}{16} & \cos\frac{27\pi}{16} & \cos\frac{33\pi}{16} & \cos\frac{39\pi}{16} & \cos\frac{45\pi}{16} \\ \cos\frac{4\pi}{16} & \cos\frac{12\pi}{16} & \cos\frac{20\pi}{16} & \cos\frac{28\pi}{16} & \cos\frac{36\pi}{16} & \cos\frac{44\pi}{16} & \cos\frac{52\pi}{16} & \cos\frac{60\pi}{16} \\ \cos\frac{5\pi}{16} & \cos\frac{15\pi}{16} & \cos\frac{25\pi}{16} & \cos\frac{35\pi}{16} & \cos\frac{45\pi}{16} & \cos\frac{55\pi}{16} & \cos\frac{65\pi}{16} & \cos\frac{75\pi}{16} \\ \cos\frac{6\pi}{16} & \cos\frac{18\pi}{16} & \cos\frac{30\pi}{16} & \cos\frac{42\pi}{16} & \cos\frac{54\pi}{16} & \cos\frac{66\pi}{16} & \cos\frac{78\pi}{16} & \cos\frac{90\pi}{16} \\ \cos\frac{7\pi}{16} & \cos\frac{21\pi}{16} & \cos\frac{35\pi}{16} & \cos\frac{49\pi}{16} & \cos\frac{63\pi}{16} & \cos\frac{77\pi}{16} & \cos\frac{91\pi}{16} & \cos\frac{105\pi}{16} \end{pmatrix}$$

The transform shown by the equation 3 may be resolved into multiplication of each of eight eight-element column vectors, divided from the matrix X, by a matrix N, and multiplication of each of eight eight-element row vectors, divided from a matrix resulting from the first-stated multiplication, with the transposed matrix $N^t$.

For restoring the picture data compressed by the DCT, 8-dimensional IDCT is employed. With the IDCT, a matrix X in the real space is produced from the matrix C on the space of the spatial frequency, using the matrix of IDCT transform N' and a transposed matrix $N'^t$ thereof. The transform may be defined by the following equation (4):

$$C = N'XN'^t, \quad (4)$$

-continued $$N' = \begin{pmatrix} \frac{1}{\sqrt{2}} & \cos\frac{\pi}{16} & \cos\frac{2\pi}{16} & \cos\frac{3\pi}{16} & \cos\frac{4\pi}{16} & \cos\frac{5\pi}{16} & \cos\frac{6\pi}{16} & \cos\frac{7\pi}{16} \\ \frac{1}{\sqrt{2}} & \cos\frac{3\pi}{16} & \cos\frac{6\pi}{16} & \cos\frac{9\pi}{16} & \cos\frac{12\pi}{16} & \cos\frac{15\pi}{16} & \cos\frac{18\pi}{16} & \cos\frac{21\pi}{16} \\ \frac{1}{\sqrt{2}} & \cos\frac{5\pi}{16} & \cos\frac{10\pi}{16} & \cos\frac{15\pi}{16} & \cos\frac{20\pi}{16} & \cos\frac{25\pi}{16} & \cos\frac{20\pi}{16} & \cos\frac{35\pi}{16} \\ \frac{1}{\sqrt{2}} & \cos\frac{7\pi}{16} & \cos\frac{14\pi}{16} & \cos\frac{21\pi}{16} & \cos\frac{28\pi}{16} & \cos\frac{35\pi}{16} & \cos\frac{42\pi}{16} & \cos\frac{49\pi}{16} \\ \frac{1}{\sqrt{2}} & \cos\frac{9\pi}{16} & \cos\frac{18\pi}{16} & \cos\frac{27\pi}{16} & \cos\frac{36\pi}{16} & \cos\frac{45\pi}{16} & \cos\frac{54\pi}{16} & \cos\frac{63\pi}{16} \\ \frac{1}{\sqrt{2}} & \cos\frac{11\pi}{16} & \cos\frac{22\pi}{16} & \cos\frac{33\pi}{16} & \cos\frac{44\pi}{16} & \cos\frac{55\pi}{16} & \cos\frac{66\pi}{16} & \cos\frac{77\pi}{16} \\ \frac{1}{\sqrt{2}} & \cos\frac{13\pi}{16} & \cos\frac{26\pi}{16} & \cos\frac{39\pi}{16} & \cos\frac{52\pi}{16} & \cos\frac{65\pi}{16} & \cos\frac{78\pi}{16} & \cos\frac{91\pi}{16} \\ \frac{1}{\sqrt{2}} & \cos\frac{15\pi}{16} & \cos\frac{30\pi}{16} & \cos\frac{45\pi}{16} & \cos\frac{60\pi}{16} & \cos\frac{75\pi}{16} & \cos\frac{90\pi}{16} & \cos\frac{105\pi}{16} \end{pmatrix}$$

The transform of the equation (4) may also be resolved into the multiplication of an eight-column column vectors on the space of the spatial frequency by the matrix of transform N' and the multiplication of an eight-row row vectors of a matrix resulting from the first-stated multiplication by the transposed matrix $N'^t$.

With the above-described 8-dimensional DCT, 8-dot picture data on the coordinate x may be resolved into eight-component coefficients, namely a dc level not having a zero-crossing point and a cosine wave B having one zero-crossing point up to a cosine wave H having seven zero-crossing points, as shown in FIG. 1, The matrix of DCT transform according to the equation (3) is constituted by eight eight-element base unit vectors. These eight base unit vectors are constituted by data produced on sampling the dc level and cosine waves shown at A to H in FIG. 1 at eight points dividing the eight-dot width thereof into seven equal lengths.

Meanwhile, the elements of the matrix of the DCT transform N and the matrix of the IDCT transform N' are all irrational numbers, so that, if the above transform is to be executed with high accuracy, a multiplication circuit having a sufficiently long word length is required, and hence the circuit scale is increased on the whole. On the other hand, if picture data is compressed and restored subsequently, it is desirable for the difference between the original data and the restored data to be as small as possible to assure high reproducibility.

In general, when restoring original picture data from the compressed data, picture data having high reproducibility and high quality is desired. However, there are occasions where this is not the case, that is where low-quality data suffices.

A typical example is searching (quick viewing) in which case it is sufficient if the contents of the pictures may be grasped only roughly, so that low-quality data suffices. As a matter of course, a device for restoring low-quality picture data from the corresponding compressed data may be simpler in construction than a device for restoring high-quality picture data from the corresponding compressed data.

Conversion of the compressed data into low-quality picture data may be achieved by compulsorily setting the components of higher frequencies, such as D, E, F, G and H components, shown in FIG. 1, to zero during decoding of the re-quantized data. In this manner, low-quality picture data, which is devoid of high-frequency components, that is slightly blurred, is reproduced on IDCT.

A device for carrying out such method is required to perform an arithmetic-logical operation with respect only to the components A, B and C in FIG. 1. It is unnecessary to carry out an arithmetic-logical operation on the components D, E, F, G and H because these components are substantially zero.

Consequently, the device for restoring low-quality picture data from the corresponding compressed data may be simpler in construction than a device for restoring high-quality picture data from the corresponding compressed data, because it is unnecessary to carry out the operation on the components D to H.

Meanwhile, the components A, B and C in FIG. 1 are the following eight-element vectors:

A=[1/√2, 1/√2, 1/√2, 1/√2, 1/√2, 1/√2, 1/√2, 1/√2]

B=[cos(π/16), cos(3π/16), cos(5π/16), cos(7π/16), cos(9π/16), cos(11π/16), cos(13π/16), cos(15π/16)]

C=[cos(2π/16), cos(6π/16), cos(10π/16), cos(14π/16), cos(18π/16), cos(22π/16), cos(26π/16), cos(30π/16)]

Therefore, 24 multiplicative operations involving 1√2, cos(π/16), cos(3π/16) or the like as multiplicands, are necessitated for the arithmetic-logical operations for the components A, B and C.

It is therefore an object of the present invention to provide a picture reproducing device in which data restoration may be achieved with reproducibility approximately as high as when DCT and IDCT are employed and in which the circuit scale on the whole may be reduced as compared to that in the conventional device.

It is another object of the present invention to provide a picture reproducing device in-which low-quality picture data may be restored from the corresponding compressed data by a smaller number of arithmetic-logical operations than in the conventional device.

DISCLOSURE OF THE INVENTION

The present invention provides a picture reproducing device for reproducing picture data processed in an orthogonal transform circuit in which picture data are grouped into blocks each having N picture data, where N is an integer of 2 or more, transform is performed on the block basis for producing j-dimensional component coefficients of from a 0-dimensional component to a (N– 1) dimensional component, and in which a curve which is obtained by interconnecting j M-dimensional curves, where M is an integer of one or more, and which generates j zero-crossing points, is employed for the j-dimensional components, wherein the improvement resides in that the picture reproducing device comprises a decoder having a near-linear inverse orthogonal transform circuit for approximating said curve to a straight line.

The picture reproducing device is characterized in that the totality of data on the frequency space which is the picture data transformed by orthogonal transform is entered to the decoder.

The picture reproducing device is characterized in that part of data on the frequency space which is the picture data transformed by orthogonal transform is entered to the decoder.

The picture reproducing device is characterized in that the decoder comprises an inverse variable length encoding circuit for decoding variable length coded picture data, a decoding circuit for performing an operation which is the reverse of re-quantization on picture data encoded by the variable length encoding circuit, a near-linear inverse orthogonal transform circuit for performing inverse orthogonal transform by approximation to a straight line on the picture data processed by the decoding circuit with the operation which is the reverse of re-quantization, and a block resolution circuit for rearranging elements of picture data which is produced by the near-linear inverse orthogonal transform circuit and which is grouped into blocks on the real space.

The picture reproducing device is characterized in that the decoder performs decoding on picture data reproduced from a recording medium on which picture data obtained on DCT is recorded.

The picture reproducing device is characterized in that the decoder is provided in a reproducing system of a video tape recorder having a built-in video camera.

The picture reproducing device is characterized in that a picture reproduced by the decoder is displayed on an electronic view finder.

The picture reproducing device is characterized in that a plurality of reproducing units for reproducing picture data from a recording medium on which the picture data produced by DCT is recorded, with the picture data reproduced by each of the reproducing units being selectively supplied to the decoder.

BRIEF DESCRIPTION OF THE DRAWINGS

FIG. 9 is a block circuit diagram showing an arrangement of a picture reproducing system to which the picture reproducing device according to the present invention is applied.

BEST MODE FOR CARRYING OUT THE INVENTION

Figure 2:
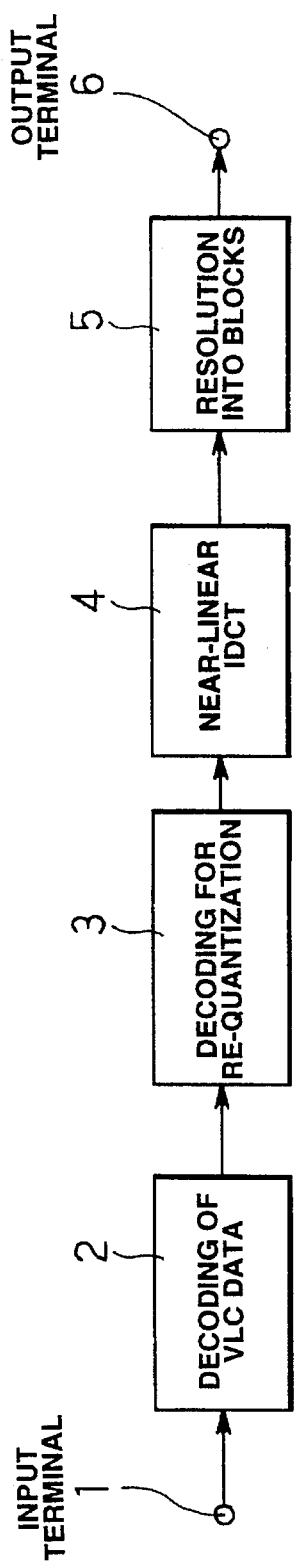
FIG. 2 is a block diagram showing essential parts of a picture reproducing apparatus according to the present invention.

The picture reproducing device according to the present invention is arranged as shown for example in the block diagram of FIG. 2.

The picture reproducing device is adapted for reproducing picture data compressed by the 8-dimensional DCT by 8-dimensional nearly-linear IDCT. Data generated by processing with 8-dimensional DCT followed by re-quantization and variable length encoding is entered at an input terminal 1 to an IVLC circuit 2.

The IVLC circuit 2 performs an operation which is the reverse of the variable length encoding, that is variable length decoding, on the data supplied via the input terminal 1. The data processed with the variable length decoding by the IVLC circuit 2 is supplied to a decoding circuit 3.

The decoding circuit 3 performs a decoding operation, that is an operation which is the reverse of the re-quantization on the data supplied from the IVLC circuit 2, for generating data indicating the elements $c_{ij}$ of the matrix C on the space of the spatial frequency defined by the equation 1. The elements $c_{ij}$ of the matrix C generated by the decoding circuit 3 are supplied to an 8-dimensional near-linear IDCT circuit 4.

The nearly-linear IDCT circuit 4 performs a near-linear IDCT operation on data supplied from the decoding circuit 3 for transforming the elements $c_{ij}$ of the matrix C on the spatial frequency domain into data indicating the elements $x_{ij}$ of the matrix X on the real space. The data indicating the elements $x_{ij}$ of the matrix X on the real space, as obtained by the nearly-linear IDCT circuit 4, are outputted from a block resolution circuit 5 as replay picture data via an output terminal 6.

In our co-pending patent application No.3-46858 (JP Patent Kokai Publication No.4-282988), the present inventors have proposed, as a picture data converting device, a near-linear DCT device in which input picture data is grouped into blocks each composed of eight pixels and transform is performed on the block basis for producing coefficients of j-dimensional components, namely 0-dimensional to 7-dimensional components, and in which a curve which is obtained by interconnecting j straight lines, for example, and which produces j zero-crossings, is employed as the above-mentioned j-dimensional components.

Figure 3:
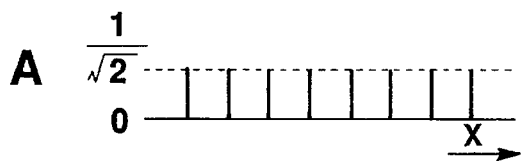
FIG. 3 is a diagrammatic view for illustrating the base unit vectors of a matrix of the near-linear 8-dimensional DCT transform.
Figure 3:
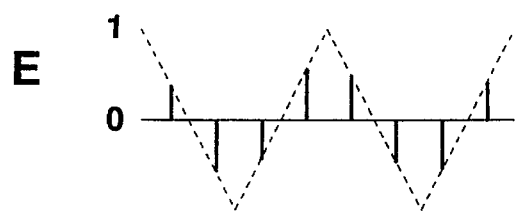
Figure 3:
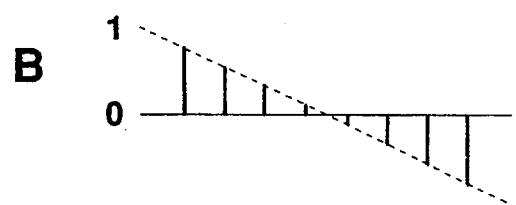
Figure 3:
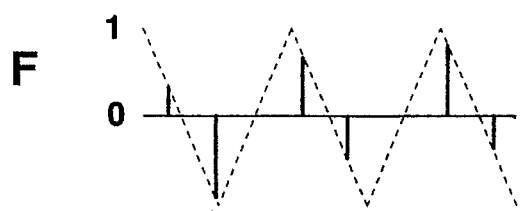
Figure 3:
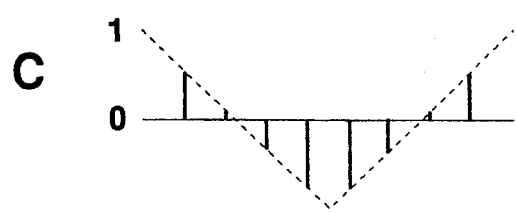
Figure 3:
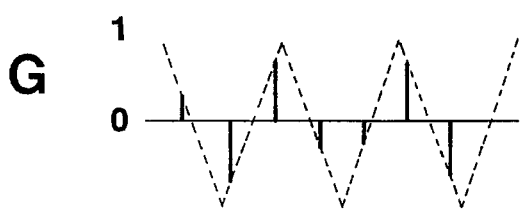
Figure 3:
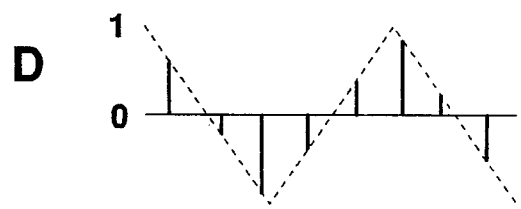
Figure 3:
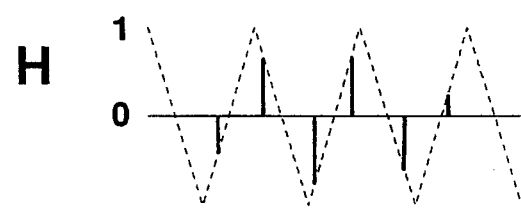

FIG. 3 shows the base unit vectors of the near-linear DCT. The linear component A, which is ½ in the above-mentioned co-pending patent application No.3-46858, is set to $1/\sqrt{2}$ according to the present invention for matching to the magnitude of the linear component A of DCT shown in FIG. 1.

That is, 8-dot width picture data on the coordinate x in FIG. 3 is resolved into eight-component coefficients which represent picture data on the frequency domain. In the present embodiment, these eight components are comprised of a dc level having a value of $1/\sqrt{2}$, as shown at A in FIG. 3, a straight line linearly changed from 1 to −1 within an 8-dot width, as shown at B in FIG. 3, a folded line formed by interconnecting two straight lines and linearly changed from 1 to −1 and again to 1 for presenting two zero-crossing points, as shown at C in FIG. 3, and folded lines formed by interconnecting three to seven straight lines and linearly changed from 1 to −1 for presenting three to seven zero-crossing points, as shown at D to H in FIG. 3. Since components of folded lines are employed in the present embodiment, the present conversion system is termed an 8-dimensional near-linear DCT. Besides, in the present embodiment, near-linear DCT is performed on an 8-row× 8-column matrix X made up of 8 sets each consisting of 8 dots of picture data as defined by the equation (1) is processed with linear DCT for producing an 8-row×8-column matrix C on the frequency domain as defined by the equation (1).

For mathematically expressing the transform by the 8-dimensional non-linear DCT according to the present embodiment, the 8-row×8-column matrix to be transformed is defined in the following manner. That is, the eight column vectors, excluding the constant of an inverse matrix of the matrix M, are assumed to be vectors having, as vector elements, the data obtained on sampling the dc level and the folded lines shown at A to H in FIG. 3 at points corresponding to division into eight equal lengths of an 8-dot width. These points correspond to the median points of the eight pixels. That is, the elements of the first row of the matrix M are all $1/\sqrt{2}$, the elements of the second row of the matrix M are all 192/291, 128/291, ..., −192/291, etc. The elements of the remaining rows may be found in a similar manner. By employing the transform matrix M and the transpose M' of the matrix M, the 8-dimensional near-linear DCT of the present embodiment may be expressed as shown in the following equation (5):

$$C = \frac{1}{8} MXM^t, \quad (5)$$

$$M = \begin{pmatrix} \frac{1}{2} & \frac{1}{2} & \frac{1}{2} & \frac{1}{2} & \frac{1}{2} & \frac{1}{2} & \frac{1}{2} & \frac{1}{2} \\ \frac{192}{291} & \frac{128}{291} & \frac{100}{291} & \frac{44}{291} & -\frac{44}{291} & -\frac{100}{291} & -\frac{128}{291} & -\frac{192}{291} \\ \frac{3}{5} & \frac{1}{5} & -\frac{1}{5} & -\frac{3}{5} & -\frac{3}{5} & -\frac{1}{5} & \frac{1}{5} & \frac{3}{5} \\ \frac{128}{291} & -\frac{44}{291} & -\frac{192}{291} & -\frac{100}{291} & \frac{100}{291} & \frac{192}{291} & \frac{44}{291} & -\frac{128}{291} \\ \frac{1}{2} & -\frac{1}{2} & -\frac{1}{2} & \frac{1}{2} & \frac{1}{2} & -\frac{1}{2} & -\frac{1}{2} & \frac{1}{2} \\ \frac{100}{291} & -\frac{192}{291} & \frac{44}{291} & \frac{128}{291} & -\frac{128}{291} & -\frac{44}{291} & \frac{192}{291} & -\frac{100}{291} \\ \frac{1}{5} & -\frac{3}{5} & \frac{3}{5} & -\frac{1}{5} & -\frac{1}{5} & \frac{3}{5} & -\frac{3}{5} & \frac{1}{5} \\ \frac{44}{291} & -\frac{100}{291} & \frac{128}{291} & -\frac{192}{291} & \frac{192}{291} & -\frac{128}{291} & \frac{100}{291} & -\frac{44}{291} \end{pmatrix}$$

In an 8-dimensional near-linear IDCT, which is an inverse transform of the 8-dimensional near-linear DCT, an 8-row× 8-column matrix X on the real space is found by the 8-row×8-column matrix C on the frequency domain using the following transform matrix M', which is an inverse matrix of the transform matrix M excluding the constant, and a transpose $M'^t$ of the transform matrix. The 8-dimensional near-linear IDCT may be defined as shown by the following equation (6):

$$X = 2M' CM'^t, \quad (6)$$

$$M = \begin{pmatrix} \frac{1}{2} & \frac{7}{8} & \frac{3}{4} & \frac{5}{8} & \frac{1}{2} & \frac{3}{8} & \frac{1}{4} & \frac{1}{8} \\ \frac{1}{2} & \frac{5}{8} & \frac{1}{4} & -\frac{1}{8} & -\frac{1}{2} & -\frac{7}{8} & -\frac{3}{4} & -\frac{3}{8} \\ \frac{1}{2} & \frac{3}{8} & -\frac{1}{4} & -\frac{7}{8} & -\frac{1}{2} & \frac{1}{8} & \frac{1}{4} & \frac{5}{8} \\ \frac{1}{2} & \frac{1}{8} & -\frac{3}{4} & -\frac{3}{8} & \frac{1}{2} & \frac{5}{8} & -\frac{1}{4} & -\frac{7}{8} \\ \frac{1}{2} & -\frac{1}{8} & -\frac{3}{4} & \frac{3}{8} & \frac{1}{2} & -\frac{5}{8} & -\frac{3}{4} & \frac{7}{8} \\ \frac{1}{2} & -\frac{3}{8} & -\frac{1}{4} & \frac{7}{8} & -\frac{1}{2} & -\frac{1}{8} & \frac{3}{4} & -\frac{5}{8} \\ \frac{1}{2} & -\frac{5}{8} & \frac{1}{4} & \frac{1}{8} & -\frac{1}{2} & \frac{7}{8} & -\frac{3}{4} & \frac{3}{8} \\ \frac{1}{2} & -\frac{7}{8} & \frac{3}{4} & -\frac{5}{8} & \frac{1}{2} & -\frac{3}{8} & \frac{1}{4} & -\frac{1}{8} \end{pmatrix}$$

Consequently, in the present picture reproducing apparatus, the matrix on the real space, defined by the equation (1), may be obtained by executing the transform of the near-linear 8-dimensional IDCT4 according to the equation (6) using the transform matrix M'. The block resolution circuit 5 re-arranges the elements $x_{ij}$ of the matrix X in both the horizontal and vertical directions for generating the replay picture data.

Figure 4:
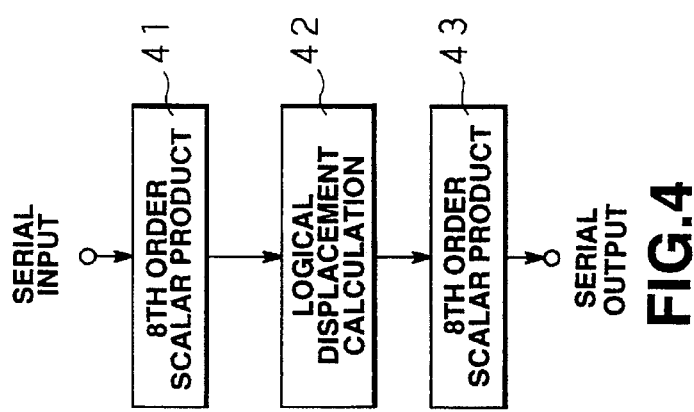
FIG. 4 is a block view showing an example of an arithmetic-logical circuit for near-linear IDCT.

By referring to FIG. 4, a specific example of the near-linear IDCT circuit 4 is explained.

In FIG. 4, the elements $c_{ij}$ of the matrix C of the equation (6) are serially supplied to a pre-stage 8-dimensional inner product processing arithmetic-logical circuit 41. The inner product arithmetic-logical circuit 41 executes the multiplication of the matrix of the transform M' of the equation (6) by the matrix C as plural inner product processing operations. The matrix indicative of the results of multiplication is sequentially outputted as eight column vectors from the inner product processing arithmetic-logical circuit 41. These eight column vectors are converted by an array converting circuit 42 into eight row vectors which are supplied then to a post-stage 8-dimensional inner product processing arithmetic-logical circuit 43. The inner product processing arithmetic-logical circuit 43 executes the processing of the matrix $M'^t$ and the matrix MC according to the equation (6) as plural inner product processing arithmetic-logical operations and serially transmits the elements $x_{ij}$ of the resulting matrix X to the above-mentioned block resolution circuit 5.

Since the multiplication by 2 of the equation (2) may be realized by bit shifting, the circuit construction is not shown for simplicity.

The above-mentioned post-stage 8-dimensional inner product processing arithmetic-logical circuit 43 may be constructed similarly to the pre-stage inner product processing arithmetic-logical circuit 43. Since the elements of the matrix of the transform M' may be expressed by $\pm 2^{31\ n}$ where n=1, 2, ... or $\pm 2^{31\ n} \pm 2^{31\ n}$ where m=1, 2, ..., and the inner product processing arithmetic-logical circuits 41, 43 may be constructed solely by the addition and subtraction circuits, without employing multiplication circuits, the circuit scale may be simplified as compared to the conventional IDCT processing arithmetic-logical circuits.

Figure 5:
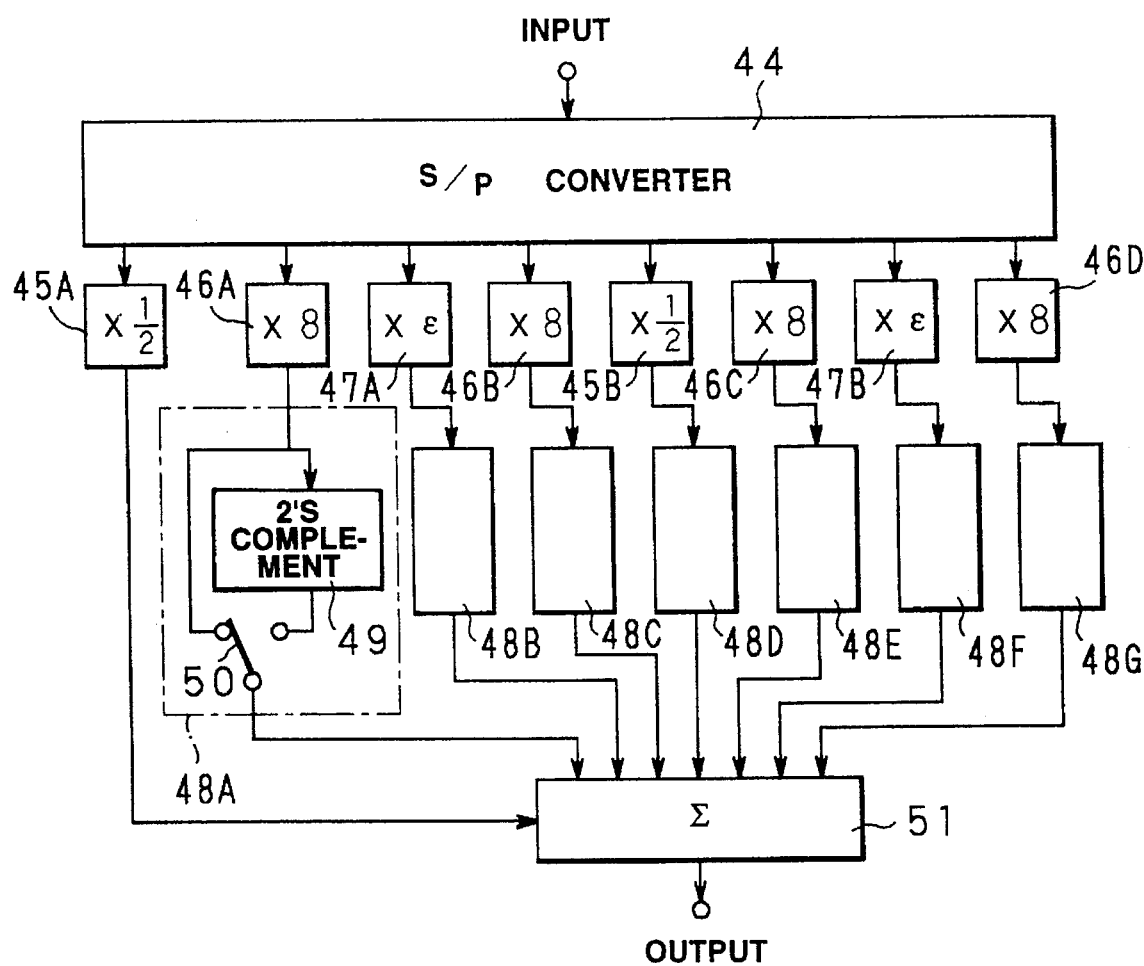
FIG. 5 is a block circuit diagram showing an 8-dimensional inner product arithmetic-logical circuit constituting the near-linear IDCT arithmetic-logical circuit shown in FIG. 4.

FIG. 5 shows a concrete construction of the inner product processing arithmetic-logical circuit 41. In FIG. 5, the elements $c_{ij}$ of the matrix C are serially supplied to a serial/parallel (S/P) converter 44 which outputs eight elements $I_0$ to $I_7$ of the column vector of the matrix C. 45A and 45B denote multiplication circuits for multiplying the elements $I_0$ and $I_4$ by ½, 46A to 46D are δ-multiplication circuits for multiplying the elements $I_1$, $I_2$, $I_3$ and $I_4$ by one of δs which are ⅛, ⅜, ⅝ or ⅞, and 47A and 48B denote ε-multiplication circuits for multiplying the $I_2$ and $I_6$ by one of εs which are ¼ or ¾.

Outputs of multiplication circuits 46A, 47A, 46B, 45B, 46C, 47B and 46D are supplied to arithmetic-logical circuits 48A to 48G having the same construction, respectively. For example, in the arithmetic-logical circuit 48A, an output of the δ-multiplication circuit 46A is supplied to an input section of a 2-input data selector 50 directly and via a 2's complement unit 49, so that the arithmetic-logical circuit 48A outputs data obtained by multiplying the input data by 1 of −1. The outputs of the multiplication circuits 45A and the arithmetic-logical circuits 48A to 48G are summed in an addition circuit 51 to produce respective elements of the column vectors of the matrix (M'C) as ultimate outputs.

If the elements of the column vector of the matrix C are denoted by $I_0$ to $I_7$ and the column vectors Of the matrix (M'C) are denoted by $O_0$ to $O_7$, the inner product processing arithmetic-logical circuit 41 executes the arithmetic-logical processing operation for the matrix (M'C) according to the equation (6) by resolution into processing operations shown by the following equation (7):

$$\begin{pmatrix} O_0 \\ O_1 \\ \cdot \\ \cdot \\ \cdot \\ O_7 \end{pmatrix} = M' \begin{pmatrix} I_0 \\ I_1 \\ \cdot \\ \cdot \\ \cdot \\ I_7 \end{pmatrix} \quad (7)$$

If the concrete form of the matrix of the transform M' according to the equation (6) is taken into account, the processing operation of the equation (7) may be converted into the processing operation shown by the following equation (8):

$$\begin{aligned}
O_0 = &\ (I_0/2 + I_4/2) + (3I_2/4 + I_6/4) + \\
&\ (7I_1/8 + 5I_3/8 + 3I_5/8 + I_7/8) \\
O_1 = &\ (I_0/2 - I_4/2) + (I_2/4 - 3I_6/4) + \\
&\ (5I_1/8 - I_3/8 - 7I_5/8 - 3I_7/8) \\
O_2 = &\ (I_0/2 - I_4/2) - (I_2/4 - 3I_6/4) + \\
&\ (3I_1/8 - 7I_3/8 + I_5/8 + 5I_7/8) \\
&\ \ldots \\
O_6 = &\ (I_0/2 - I_4/2) + (I_2/4 - 3I_6/4) + \\
&\ (5I_1/8 - I_3/8 + 7I_5/8 + 3I_7/8) \\
O_7 = &\ (I_0/2 + I_4/2) + (3I_2/4 + I_6/4) - \\
&\ (7I_1/8 + 5I_3/8 + 3I_5/8 + I_7/8)
\end{aligned} \quad (8)$$

For finding $O_0$, for example, the arithmetic-logical operation of $(I_0/2+I_4/2)$ is executed by the multiplication circuits 45A and 45B, arithmetic-logical unit 48D and the addition circuit 51, the arithmetic-logical operation of $(3I_2/4 +I_6/4)$ is executed by the ε-multiplication circuits 47A and 47B, the arithmetic-logical units 48B and 48F and the addition circuit 51, and the arithmetic-logical operation of $(7I_1/8+5I_3/8+ 3I_5/8 +I_7/8)$ is executed by the δ-multiplication circuits 46A to 46D, the arithmetic units 48A, 48C, 48E and 48G and the addition circuit 51.

Figure 6:
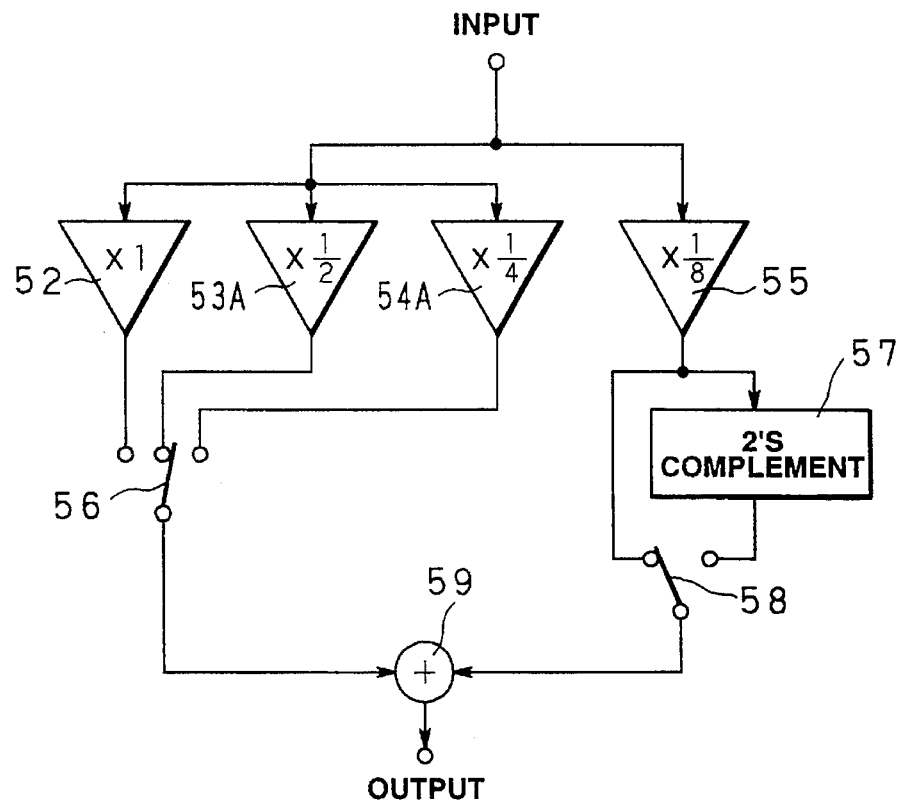
FIG. 6 is a block view showing an example of a $\beta$-multiplication circuit constituting the 8-dimensional inner product arithmetic-logical circuit shown in FIG. 5.
Figure 7:
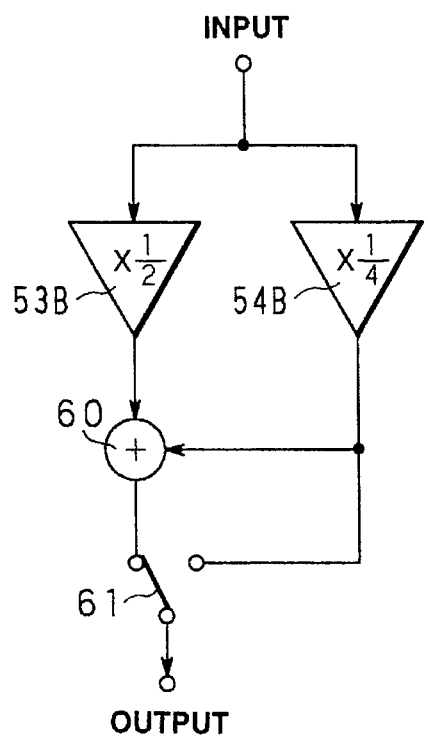
FIG. 7 is a block view showing an example of a $\gamma$-multiplication circuit constituting the 8-dimensional inner product arithmetic-logical circuit shown in FIG. 5.

Referring now to FIGS. 6 and 7, the concrete construction of the δ-multiplication circuit 46A and the ε-multiplication circuit 47A are explained.

In FIG. 6, showing an example of the δ-multiplication circuit, input data is supplied to multiplication circuits 52, 53A, 54A and 55 adapted for multiplying the input data by constants 1, ½, ¼ and ⅛, respectively, while outputs of the multiplication circuits 52, 53 and 54A are supplied to one input of a three-input data selector 56, an output of which is supplied to an input of an addition circuit 59. An output of the multiplication circuit 55 is supplied to an input of a two-input data selector 58 directly and via a 2's complement unit 57, while an output of the data selector 58 is supplied to the other input of the addition circuit 59. By changing over the state of data selection by the data selectors 59 and 61, the input data may be multiplied by one of ⅛, ⅜, ⅝ and ⅞.

FIG. 7 shows an example of the ε-multiplication unit 47A. The input data is supplied to multiplication circuits 53B, 54B adapted for multiplying the input data by constants ½ or ¼. Outputs of the multiplication circuits 53B, 54B are summed together at an addition circuit 60, an output of which is supplied to one input of a two-input data selector 61, the other input of which is supplied with an output of the multiplication circuit 57B. The input data may be multiplied by constants ¼ or ¾ by changing over the state of data selection by the data selector 61. Since the multiplication with ½ to ⅛ is simply a bit shifting operation and a bit shifter may be substituted for the multiplication circuit 53A or the like, the inner product processing arithmetic-logical circuit 41 shown in FIG. 5 may be simplified in construction for reducing the circuit scale.

On the other hand, in the inner product processing arithmetic-logical circuit 41 shown in FIG. 5, the addition circuit 51 may be constructed by seven two-input addition circuits, while the δ-multiplication circuit 46A and the ε-multiplication circuit 47A are each made up only by a two-input addition circuit. Consequently, the inner product processing arithmetic-logical circuit 41 may be constructed by 13 two-input addition circuits.

Figure 1:
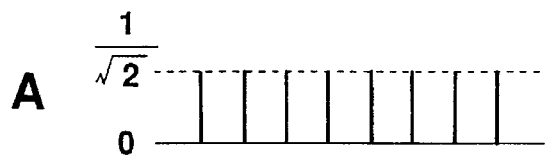
FIG. 1 is a diagrammatic view for illustrating the base unit vectors of a matrix of a conventional 8-dimensional DCT transform.
Figure 1:
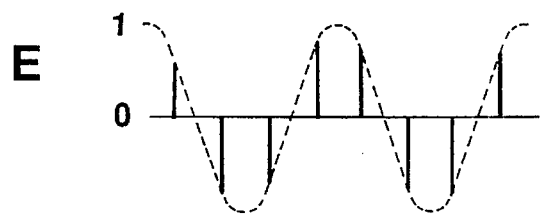
Figure 1:
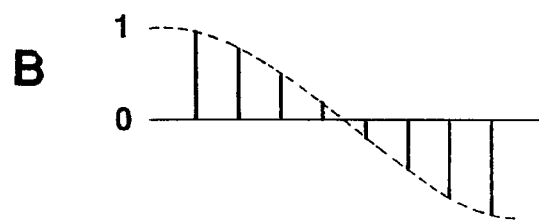
Figure 1:
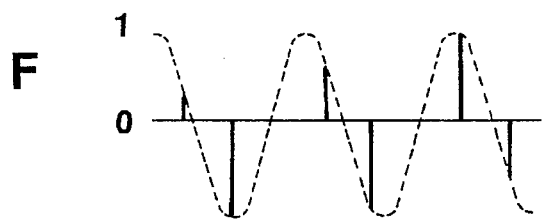
Figure 1:
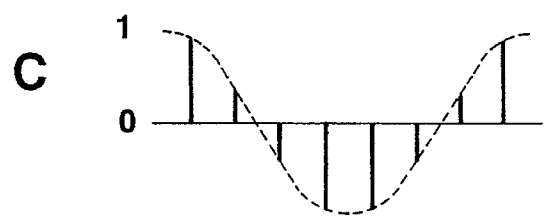
Figure 1:
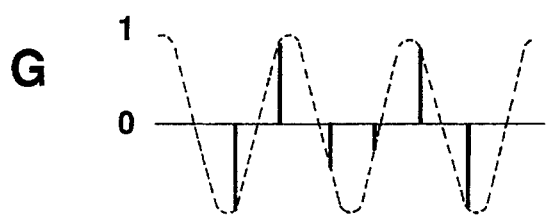
Figure 1:
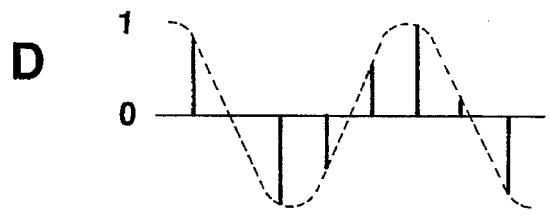
Figure 1:
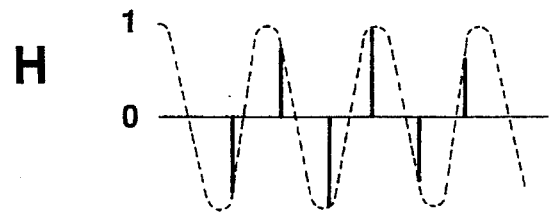

As may be seen on comparison of FIGS. 1 and 3, the vectors shown at A, B and C in FIG. 1 are substantially the same as those shown at A, B and C in FIG. 3. Consequently, in place of performing the multiplication of values corresponding to the components shown at A, B and C in FIG. 1 by the vectors shown at A, B and C in FIG. 1 as conventionally for producing the low-quality picture data, the multiplication of values corresponding to the components shown at A, B and C in FIG. 1 by the vectors shown at A, B and C in FIG. 3 may be performed for producing the low-quality picture data.

FIGS. 3A, B and C show vectors having eight values wherein $A=[1/\sqrt{2}, 1/\sqrt{2}, 1/\sqrt{2}, 1/\sqrt{2}, 1/\sqrt{2}, 1/\sqrt{2}, 1/\sqrt{2}, 1/\sqrt{2}]$ $B=[7/8, 5/8, 3/8, 1/8, -1/8, -3/8, -5/8, -7/8]$ $C=[3/4, 1/4, -1/4, -3/4, -3/4, -1/4, 1/4, 3/4]$ It will be noted that the arithmetic-logical operation for the component A necessitates eight multiplications with $1/\sqrt{2}$, while multiplication is not necessitated in the arithmetic-logical operations for the components B and C since the elements of the vectors B and C may be expressed as $\pm 2^n \pm 2^m$ and the arithmetic-logical operations with this vector may be executed by addition.

Consequently, by employing the arrangement shown in FIG. 2, a device may be provided for restoring picture data of inferior quality from data compressed by eight multiplications.

Thus it becomes possible with the above-described device to provide a device for restoring picture data of inferior quality from data compressed by eight multiplications which involves a lesser number of multiplications than that heretofore employed.

Meanwhile, the above-described picture replay device according to the present invention may be employed for verifying the recorded contents in a simple manner in e.g. a VTR with a built-in camera.

Figure 8:
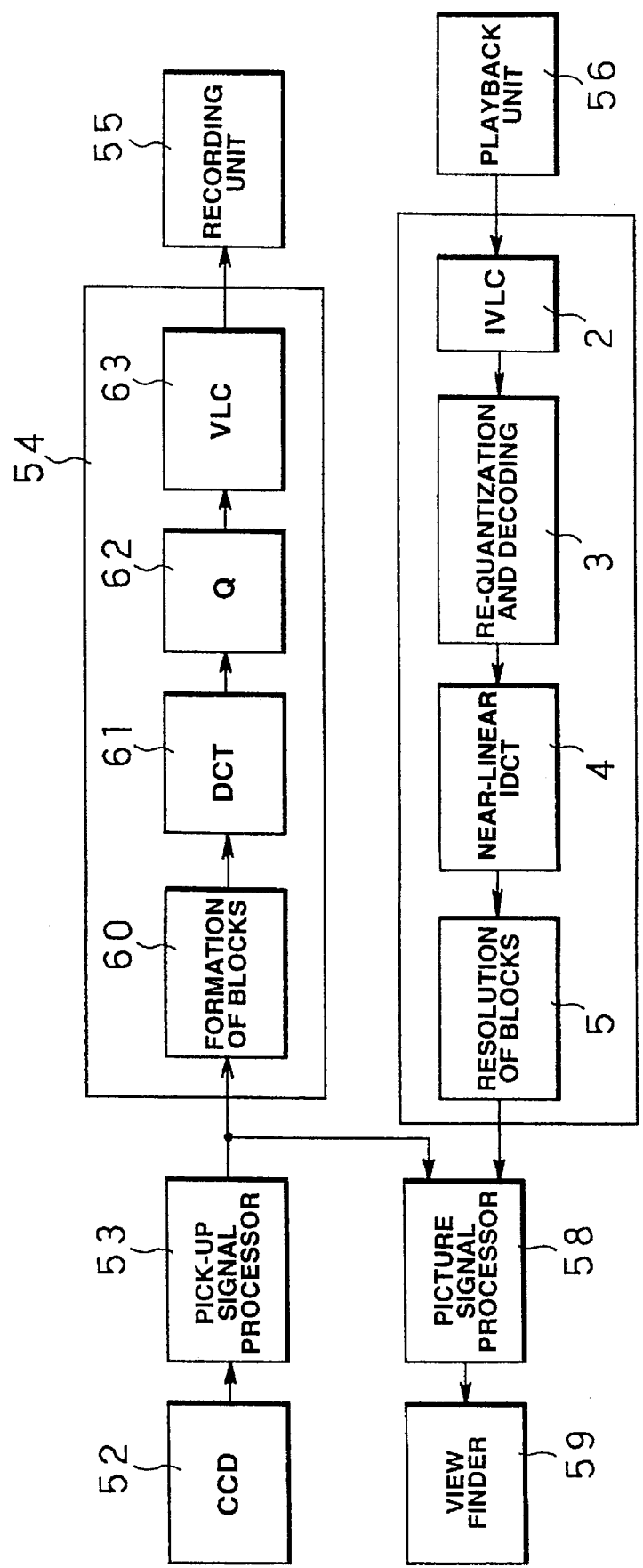
FIG. 8 is a block circuit diagram showing an arrangement of a VTR with a built-in camera to which the picture reproducing device according to the present invention is applied.

FIG. 8 shows, in a block view, a typical construction of the VTR with the built-in camera embodying the picture reproducing device according to the present invention. The VTR with the built-in camera includes, as picture processing means of a reproducing system for simplified verification of the recorded contents on the video tape by a recording unit 55 through the electronic view finder 59, a decoder 57 employing the picture reproducing device according to the present invention.

The VTR with the built-in camera includes an imaging unit 52 consisting in a CCD image sensor. The picture signals corresponding to the image output by the imaging unit 52 are generated by an imaging signal processor 53 and supplied via a picture signal processing circuit 58 to the electronic view finder 59 to permit imaging to be performed as the image of the object is verified with the aid of the electronic view finder 59.

The VTR with the built-in camera also includes an encoder 54 for compression which is supplied from the imaging signal processor 53 with the picture data digitized from picture signals. The picture data is processed by the encoder 54 with compression by 8-dimensional DCT and the compressed picture data is recorded by the recording unit 55 on the video tape.

The encoder 54 includes a DCT circuit 61 to which the picture data from the imaging signal processor 53 is supplied after formation into 8×8 blocks by a block-forming circuit 60. The transform according to the equation (3) is performed on each block by the DCT circuit 61 to produce the matrix C on the frequency domain as defined by the equation (2). Data indicating the elements $c_{ij}$ of the matrix C are re-quantized by a re-quantization circuit 62 and subsequently variable length coded by a variable length coding circuit 63 for generating compressed picture data.

If, with the present VTR with the built-in camera, the video tape having the compressed picture data recorded thereon by the recording unit 55 is reproduced by a reproducing unit 56, the compressed picture data obtained as the reply output is supplied to the decoder 57.

The decoder 57 is a picture reproducing device having an arrangement shown in FIG. 2 for reproducing the picture data compressed by 8-dimensional DCT by 8-dimensional near-linear IDCT, and comprises an IVLC circuit 2 for variable length decoding of the compressed picture data, a decoding circuit 3 for decoding the re-quantized data supplied from the IVLC circuit 2 for generating data indicating the elements $c_{ij}$ of the matrix C on the spatial frequency space defined by the equation (1), a near-linear IDCT circuit 4 for processing the data indicating the elements $c_{ij}$ of the matrix C generated by the decoding circuit 3 with near-linear inverse DCT for translating the elements $c_{ij}$ of the matrix C on the spatial frequency domain into data indicating the elements $c_{ij}$ of the matrix C on the spatial frequency domain, and a block resolution circuit 5 for re-arraying the data indicating the elements $x_{ij}$ of the matrix X on the real space for generating replay picture data.

The replay picture data reproduced in a simple manner in the decoder 57 with the near-linear 8-dimensional IDCT is supplied to the electronic view finder 59 as the analog replay picture signals via the picture signal processing unit 58.

In this manner, the recorded contents recorded on the video tape by the recording unit 55 may be verified by the electronic view finder 59.

FIG. 9 shows, in a block view, an illustrative construction of a picture replay system to which the picture reproducing device according to the present invention is applied. The picture reproducing system is adapted to perform a search operation by one of the reproducing units while performing a playback operation by the other reproducing unit. Thus the picture reproducing system includes the first reproducing unit 64 and the second reproducing unit 65 for reproducing the picture data compressed with DCT from the video tape or the video disc. The picture data obtained as replay output from the first and second reproducing units 64, 65 are selectively supplied via a changeover switch 66 to a first decoder 68 and a second decoder 69.

The changeover switch 66 is controlled as to its changeover operation by a changeover control signal generated by a changeover control unit 67 based on a changeover instruction by e.g. a manual switch.

The first decoder 68 is made up of an IVLC circuit 72 for variable length decoding the DCT compressed picture data obtained as a replay output of the first reproducing unit 64 or the second reproducing unit 65, a decoding circuit 73 for decoding the re-quantized data supplied from the IVLC circuit 72, an IDCT circuit 74 for processing the data generated by the decoding circuit 73 with inverse DCT, and a block resolution circuit 75 for rearranging data on the real space produced by the IDCT circuit 74 for generating the replay picture data.

The replay picture data, normally reproduced by the first decoder 68, is supplied to the picture signal processing unit 70.

The second decoder 69 is employed for simplified reproduction of DCT-compressed picture data obtained as replay outputs from the first or second reproducing units 64, 65, and is constructed by a picture reproducing device shown in FIG. 2 for reproducing the picture data compressed by the 8-dimensional DCT by 8-dimensional near-linear IDCT.

That is, the second decoder 69 includes an IVLC circuit 2 for variable length decoding the compressed picture data, a decoding circuit 3 for decoding the re-quantized data supplied form the IVLC circuit 2 for generating the data indicating the elements $c_{ij}$ of the matrix C on the spatial frequency space a defined by the equation (1), a near-linear IDCT circuit 4 for processing the data indicating the elements $c_{ij}$ of the matrix C generated by the decoding circuit 3 by near-linear IDCT for translating the data indicating the elements $c_{ij}$ of the matrix C on the spatial frequency space into data indicating the elements $x_{IJ}$ of the matrix X on the real space, and a block resolution circuit 5 for re-arranging the data from the near-linear IDCT circuit 4 indicating the elements $x_{ij}$ of the matrix X on the real space to generate replay picture data.

The replay picture data, reproduced in simplified manner by the second decoder 69 with the 8-dimensional near-linear IDCT, is supplied to the picture signal processing unit 70.

The picture signal processing unit 70 performs picture processing for displaying the pictures indicated by the two kinds of input replay picture data on a monitoring device 71. In the present embodiment, picture signals produced by summing and synthesizing the replay picture data and conversion into analog form is supplied from the picture signal processing unit 70 to the monitoring device 71 so that the picture indicated by the replay picture data normally reproduced by the first decoder 68 is displayed on a main screen 76 of the monitoring device 71 and the picture indicated by the replay picture data reproduced in a simplified manner by the first decoder 68 is displayed on a search window screen 77 of the monitoring device 71. The picture processing by the picture signal processing unit 70 may be realized easily by the general picture-in-picture picture processing technique.

With the above-described picture reproducing system, a search operation may be performed on a video software on one of the reproducing units while a replay picture is being displayed for appreciation on the other reproducing unit. Meanwhile, the picture signal processing unit 70 may be operated for displaying the picture indicated by the replay picture data reproduced in a simple manner by the second decoder 69 on the entire screen of the monitoring device 71.

What is claimed is:

1. A picture reproducing device for reproducing picture data processed in an orthogonal transform circuit in which picture data are grouped into blocks each having N picture data, where N is an integer of 2 or more, transform is performed on the block basis for producing j-dimensional component coefficients of from a 0-dimensional component to a (N−1) dimensional component, and in which a curve which is obtained by interconnecting j M-dimensional curves, where M is an integer of one or more, and which generates j zero-crossing points, is employed for the j-dimensional components, wherein the picture reproducing device comprises a decoder having a near-linear inverse orthogonal transform circuit for approximating said curve to a straight line.

2. The picture reproducing device as claimed in claim 1 wherein the totality of data on the frequency space which is the picture data transformed by orthogonal transform is entered to said decoder.

3. The picture reproducing device as claimed in claim 1 wherein part of data on the frequency space which is the picture data transformed by orthogonal transform is entered to said decoder.

4. The picture reproducing device as claimed in claim 1 wherein said decoder comprises an inverse variable length encoding circuit for decoding variable length coded picture data, a decoding circuit for performing an operation which is the reverse of re-quantization on picture data encoded by said variable length encoding circuit, a near-linear inverse orthogonal transform circuit for performing inverse orthogonal transform by approximation to a straight line on the picture data processed by the decoding circuit with the operation which is the reverse of re-quantization, and a block resolution circuit for rearranging elements of picture data which is produced by the near-linear inverse orthogonal transform circuit and which is grouped into blocks on the real space.

5. The picture reproducing device as claimed in claim 1 wherein said decoder performs decoding on picture data reproduced from a recording medium on which picture data obtained on DCT is recorded.

6. The picture reproducing device as claimed in claim 1 wherein said decoder is provided in a reproducing system of a video tape recorder having a built-in video camera.

7. The picture reproducing device as claimed in claim 1 wherein a picture reproduced by said decoder is displayed on an electronic view finder.

8. The picture reproducing device as claimed in claim 1 having a plurality of reproducing units for reproducing picture data from a recording medium on which said picture data produced by DCT is recorded, the picture data reproduced by each of said reproducing units being selectively supplied to said decoder.

9. A method for reproducing a picture data processed in an orthogonal transform circuit comprising the steps of:

grouping picture data into blocks each having N picture data where N is an integer of 2 or more;

performing a transform on the blocks for producing j-dimensional component coefficients of from an 0-dimensional component to an (N−1) dimensional component;

obtaining a curve by interconnecting j M-dimensional curves, where M is an integer of one or more;

generating j zero-crossing points, employed for the j-dimensional components;

approximating said curve to a straight line with a decoder having a near-linear inverse orthogonal transform circuit;

determining a time when low-quality picture data restoration is acceptable; and compulsorily setting selected frequencies to zero during said approximating step when said determination is in the affirmative in order to reproduce low-quality picture data during that time.

10. A method as in claim 9, wherein said decoder comprises an inverse variable length encoding circuit for decoding variable length coded picture data, a decoding circuit for performing an operation which is the reverse of re-quantization on picture data encoded by said variable length encoding circuit, a near-linear inverse orthogonal transform circuit for performing inverse orthogonal transform by approximation to a straight line on the picture data processed by the decoding circuit with the operation which is the reverse of re-quantization, and a block resolution circuit for rearranging elements of picture data which is produced by the near-linear inverse orthogonal transform circuit and which is grouped into blocks on the real space.

11. A method as in claim 9, wherein said decoder performs decoding on picture data reproduced from a recording medium on which picture data obtained on DCT is recorded.

12. A method as in claim 9, wherein said decoder is provided in a reproducing system of a video tape recorder having a built-in video camera.

13. A method as in claim 9, further comprising the step of:

displaying a picture reproduced by said decoder on an electronic view finder.

14. A method as in claim 9 further comprising the steps of:

providing a plurality of reproducing units for reproducing picture data from a recording medium on which said picture data produced by DCT is recorded; and selectively supplying the picture data reproduced by each of said reproducing units to said decoder.

\* \* \* \* \*